Nov. 19, 1940.       P. ORR       2,221,898
TRANSMISSION SYNCHRONIZER
Filed Aug. 5, 1938       2 Sheets-Sheet 1
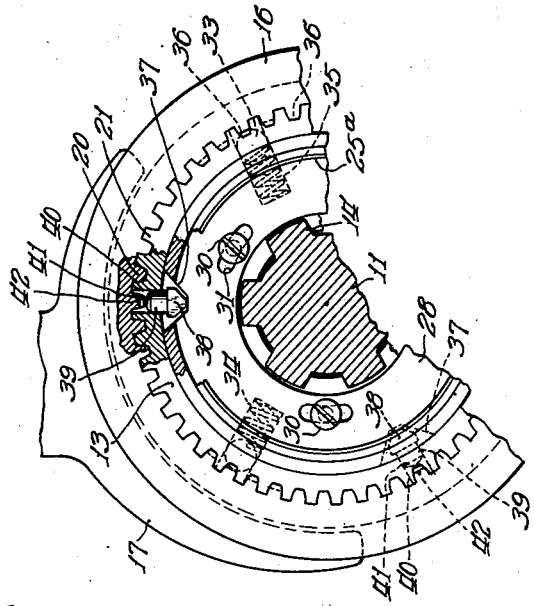
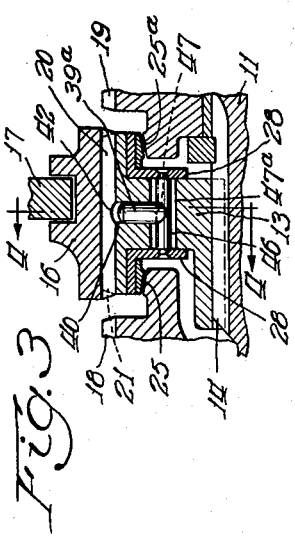
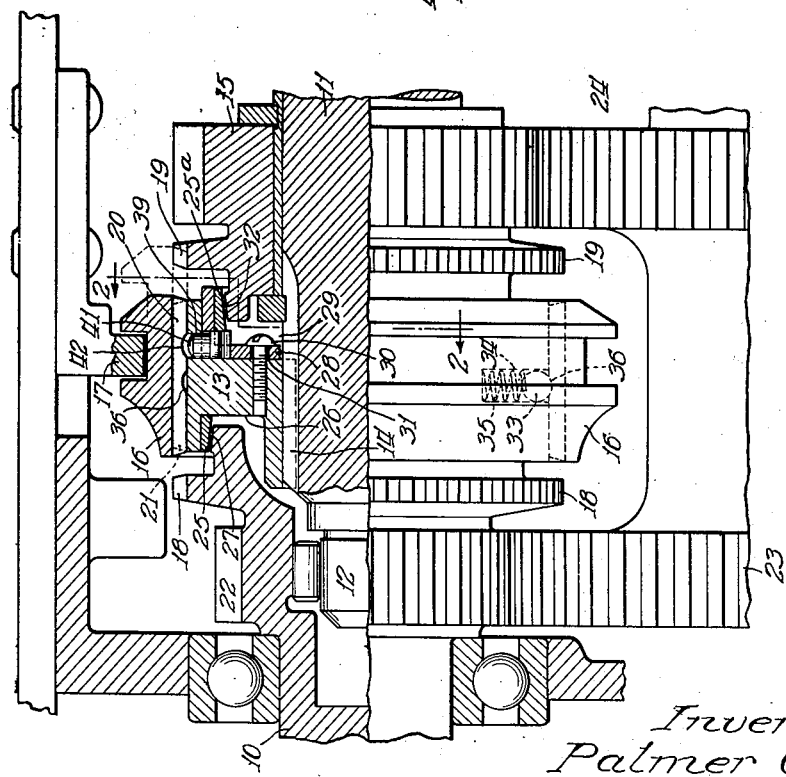
Inventor:
Palmer Orr
By: Edward C. Gritzbaugh
Atty.

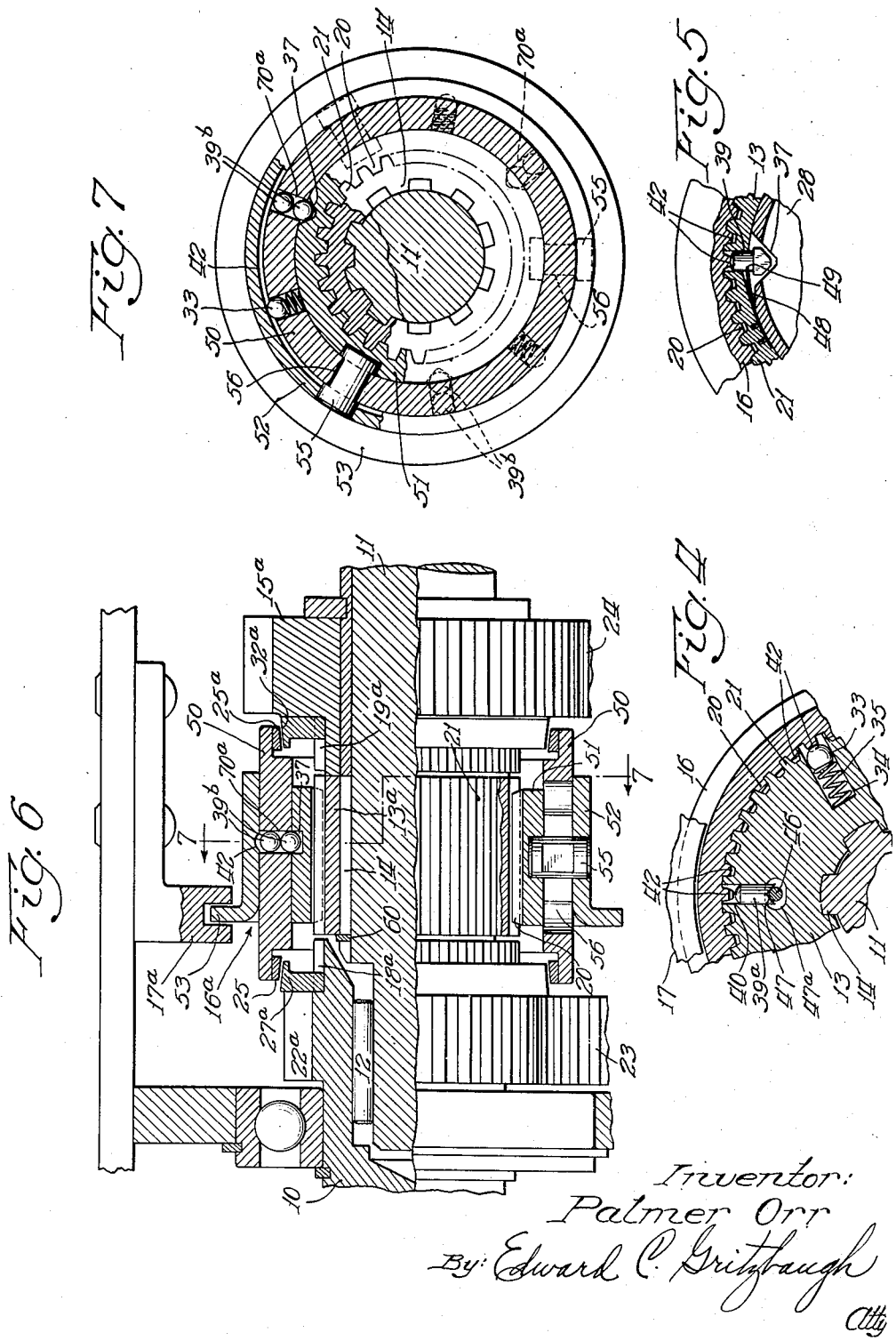

Patented Nov. 19, 1940

2,221,898

UNITED STATES PATENT OFFICE 2,221,898

TRANSMISSION SYNCHRONIZER

Palmer Orr, Muncie, Ind., assignor to Borg-Warner Corporation, Chicago, Ill., a corporation of Illinois Application August 5, 1938, Serial No. 223,153

14 Claims. (Cl. 192—53)

This invention relates to synchronizing change speed gear transmissions as the type employed, for example in motor vehicles, wherein there is provided means for effecting synchronization of a pair or pairs of torque transmitting members preparatory to connecting said members in positive drive engagement with each other by means of an axially movable jaw clutch element.

The invention is particularly directed to synchronizing transmissions of the type wherein the synchronizing means comprises friction clutch elements adapted to become drivingly engaged with each other in the initial stage of shifting movement, as a result of axial thrust transmitted to one of such elements from the movable jaw clutch element, and has as its primary object to provide, in such a mechanism, novel and improved "blocker" mechanism for preventing the positive drive engagement of the members prior to the time that synchronization is effected.

In conventional "blocker" synchcronizers, the movable friction clutch elements are provided with peripheral, radially projecting obstructions, sometimes in the form of teeth, between which must pass spaced portions, such as the positive clutch teeth of the movable clutch element, before such clutch teeth can become engaged with their coacting clutch elements.

The present invention contemplates the embodiment of positive blocking means which does not require the use of the blocker teeth on the movable friction clutch element. To this end, the invention contemplates an arrangement in which a locking element, extending radially through the hub member in which a movable friction clutch element is mounted for axial sliding movement and limited circumferential movement or "lost motion," is adapted to be forced outwardly by a cammed region of said movable friction clutch element as a result of biasing of said friction clutch element to one limit of its lost motion connection under initial engagement of said friction clutch element with its coacting friction clutch element, and is adapted to engage the movable jaw clutch element, when thus forced outwardly, so as to lock the same against axial movement. When synchronization is effected, the movable friction clutch element is adapted to move toward the other limit of its lost motion connection, thereby releasing the bolt and allowing the same to be moved to an inoperative position by the axial pressure of the movable jaw clutch against its outer end.

The above and other objects, advantages and uses of my invention will become apparent from a reading of the following specification and claims taken in connection with the appended drawings which form a part of the specification and wherein:

Fig. 1 is an axial sectional view of a synchronizing transmission embodying the invention;

Fig. 2 is a transverse sectional view thereof taken as indicated by the line 2—2 of Fig. 1;

Fig. 3 is an axial sectional view of a modified form of the invention;

Fig. 4 is a transverse sectional view of the same, taken as indicated by the line 4—4 of Fig. 3;

Fig. 5 is a transverse sectional view of another modification of the invention;

Fig. 6 is an axial sectional view of another modification of the invention; and

Fig. 7 is a transverse sectional view of the same taken as indicated by the line 7—7 of Fig. 6.

As illustrative of one form in which the invention may be embodied, I have shown in Fig. 1, a portion of a synchronizing transmission including a torque transmitting member 10 forming the rear end of the drive shaft of the transmission, and torque transmitting members, including the driven shaft 11, piloted as at 12 in the member 10, and the hub member 13, splined as at 14 on the driven shaft 11. Positive drive connection may be established between the torque transmitting members 10 and 11, or between a reduction geared, torque transmitting member 15 and the member 11, by an axially movable jaw clutch element 16 adapted to be shifted by a shifting fork 17 into positive clutching engagement with clutch teeth 18 formed on the torque transmitting member 10, or clutch teeth 19 formed on the torque transmitting member 15. To this end, the movable clutch element 16 is formed with internal clutch teeth 20, in sliding splined engagement with teeth 21 forming the periphery of the hub member 13, and adapted to engage the clutch teeth 18 or 19 when moved axially.

The torque transmitting member 15 is driven at reduced speed by a pinion 22 on the driven shaft 10, through the medium of a conventional countershaft gear cluster including a gear 23 meshing with the pinion 22 and a gear 24 meshing with the gear 15. Upon being moved into clutching engagement with the clutch teeth 18, the movable jaw clutch element 16 will receive rotation from the drive shaft 10 and transmit it directly through the hub 13 to the driven shaft 11. Upon being moved in the opposite direction into clutching engagement with the teeth 19, the movable clutch element 16 will receive rotation through the torque transmitting member 15 from the countershaft gear cluster 23, 24 and will transmit it through the hub member 13 to the driven shaft 11.

In order to synchronize a torque transmitting member 10 or 15 with the hub 13, preparatory to establishing such clutching engagement, I provide a friction clutch facing 25, fixed in an axial depression 26 on one side of the hub 13 and adapted to engage a coacting friction clutch face 27 formed on the torque transmitting member 10, and a facing 25a forming part of a movable synchronizer ring 28 adapted to engage a friction clutch face 32 formed on the torque transmitting member 15. The synchronizer ring 28 is L-shaped in cross-section, and mounted in an axial recess 29 in the other side of the hub 13, for limited circumferential movement relative thereto. Such limited circumferential movement is provided for by a lost motion connection comprising headed securing elements 30 extended through circumferentially elongated slots 31 in the synchronizer ring 28 and secured in the hub 13.

The synchronizer ring 28 is adapted to be biased to one limit of its lost motion connection as a result of initial engagement with the friction face 32 under axial thrust transmitted from the movable jaw clutch element by means of a conventional poppet comprising a ball 33 caged in a radial cavity 34 in the hub 13 and urged by a spring 35, under compression between the ball 33 and the bottom of the cavity 34, into engagement with a rounded depression 36 in one of the teeth 20 of the movable jaw clutch element 16. An alternative arrangement for producing the biasing action is to provide for a constant slight engagement of the friction clutch faces through the medium of an intervening oil film, which engagement may be provided for by a slight looseness in the lost motion connection 30, 31.

In the periphery of the synchronizer ring 28 is a notch having cammed faces 37 adapted, when the synchronizer ring 28 is thus biased, to engage against the wedge-shaped inner end 38 of a locking bolt 39 which is slidable in a radical opening 40 in the periphery of the hub 13. The outer end of the locking bolt 39 is cammed or rounded as at 41 and adapted to engage in a rounded depression 42 in one of the teeth 20 of the movable jaw clutch element 16, when the bolt 39 is forced outwardly as a result of the biasing of the synchronizer ring 28. The notch 42 is axially spaced from the notch 36. Preferably there are a plurality of the locking bolts 39, as shown.

As a result of the engagement of the bolt 39 in the notch 42, the movable jaw clutch element 16 will be locked against axial advance relative to the hub 13 and synchronizer ring 28 until synchronization has been completed. As long as relative rotation exists between the synchronizer ring 28 and its cooperating friction clutch face 32, the synchronizer ring 28 will be maintained in its biased position whereby the locking bolt 39 will be maintained in locking engagement with the movable jaw clutch element 16, blocking axial advance thereof into clutching engagement with the jaw clutch teeth 19. When synchronization is reached, there will be a momentary reversal of the relative directions of rotation of the torque transmitting members, causing the synchronizer ring 28 to be oscillated toward its other limit of lost motion relative to the hub 13, and in so doing, it will allow the bolt 39 to recede radially inwardly under the camming action of the notch 42 against the rounded head 41 in response to axial urging of the movable jaw clutch element 13 by the fork 17. When, during such reversal, the parts arrive at the position shown in Fig. 2, the bolt 39 will release the movable jaw clutch element 16 and allow the same to advance into clutching engagement with the clutch teeth 19, as indicated in dotted lines in Fig. 1.

The hub 13 is axially slidable on the driven shaft 11 to allow the friction clutch facings 25, 25a to be moved axially a slight amount so as to establish sufficient frictional engagement between the coacting clutch faces for synchronizing purposes. The bolt 39 may serve, in addition to its blocking function, as a thrust transmitting member for transmitting axial thrust from the movable jaw clutch element 16 to the hub 13. In this capacity, it may assist the poppet 33—36, or in the event that the poppet is not employed, it may serve alone for this purpose.

In the form shown in Fig. 1, the poppet 33—36 is relied upon for transmitting axial thrust to the fixed friction facing 25 for synchronizing in direct drive.

In the form shown in Figs. 3 and 4, both friction facings 25 and 25a are carried by movably mounted synchronizer rings 28, which are connected by tie rods 46 loosely extended through circumferentially elongated slots 47a in the web of the hub 13. The ends of the tie rods 46 are secured in the synchronizer rings 28.

Locking bolts 39a, radially slidable in openings 40 in the rim of the hub 13, are provided at their inner ends with cam notches 47 in embracing relation to the tie rods 46. The outer ends of the bolts 39a are rounded to engage the cam notches 42 of the movable jaw clutch element 16, the same as in the preferred form of the invention. Biasing of either of the rings 28 causes the tie rods 46 to engage the cammed sides of the notches 47 so as to force the bolt 39a radially outwardly. Further than this, the operation is the same as in the preferred form described above, with the exception that the blocking function of the bolt 39a may apply to both instead of only one of the friction clutch facings 25, 25a.

In either form of the invention, the poppets 33—36 may be arranged in the same plane as the bolts 39 or 39a, and circumferentially intermediate the bolts as shown in Fig. 4, so as to engage in the same series of notches 42 as are engaged by the bolts 39 or 39a.

The poppets 33—36 may be eliminated entirely if desired, and the bolts 39 or 39a, as the case may be, may be arranged to perform a function of the poppets as well as their own function described above. To this end, the bolts 39 or 39a may be yieldingly urged radially outwardly by suitable spring means such as the leaf springs 48, secured to the rim of the hub 13 and engaging in notches 49 formed in the bolts 39 or 39a, as shown in Fig. 5, or by centrifugal force.

Instead of the bolt 39, the blocking means may, as shown in Figs. 6 and 7, take the form of a pair of balls 39b, the outer of which is adapted to engage the notch 42 in the movable jaw clutch element 16, and the inner of which is adapted to engage the camming notch 37 in the synchronizer ring 28.

Figs. 6 and 7, show the invention as embodied in a type of synchronizing transmission in which the friction clutch elements instead of being radially within the radius of the jaw clutch teeth 18, 19 and 20, are disposed radially beyond such jaw clutch teeth. In such an arrangement, the friction facings 25, 25a may both be fixedly mounted in a sleeve 50 which encircles the inner sleeve 51 of the movable jaw clutch element referred to in this case by the reference numeral 16a, and in turn is encircled by the outer shell 52 of the movable jaw clutch element. The shell 52 may be flanged as at 53 for engagement with the shifting fork 17a. The balls 39b may be arranged in radial openings 70a in the friction clutch sleeve 50. The sleeve 51 and shell 52 may be rigidly secured together by pins 55 extending through axially elongated slots 56 in the sleeve 50. The coacting friction faces 27a and 32a may be formed on separate elements secured to the pinion 22a and the gear 15a respectively as shown. The jaw clutch teeth 18a and 19a may be formed inside the radius of the friction faces 27a and 32a respectively as shown, and adapted to be engaged by the teeth 20 of the movable jaw clutch sleeve 51, which may be slidably splined on the relatively small diameter hub 13a as shown. The hub 13a may in this case be fixed against axial movement by engagement at one end with the gear member 15a and at its other end with a retaining ring 60.

I claim:

1. In a synchronizing transmission, a pair of torque transmitting members to be synchronized, a movable jaw clutch element drivingly associated with one of said members and adapted to be moved into positive clutching engagement with a jaw clutch element drivingly associated with the other member, a movable friction clutch element having a rotary lost motion driving connection with said one member and adapted to be moved into frictional driving engagement with a friction clutch element drivingly associated with said other member, and means acted upon by said movable friction clutch element adapted, when the latter is biased to one limit of its lost motion connection, to be radially projected into engagement with said movable jaw clutch element for locking said movable clutch elements together until synchronization has been effected.

2. In a synchronizing transmission, a pair of torque transmitting members to be synchronized, one of said members comprising a hub having a rim, a movable jaw clutch sleeve encircling said rim, drivingly associated therewith and adapted to be moved axially into positive clutching engagement with a jaw clutch element drivingly associated with the other member, a synchronizer ring disposed within said rim, having a lost motion driving connection with said hub, and adapted to be moved axially into frictional driving engagement with a friction clutch element drivingly associated with said other member, and a bolt carried by said hub, engaged by said synchronizer ring, and adapted when the latter is biased to one limit of its lost motion connection, to be projected radially outwardly through said rim into a depression in the interior periphery of said movable jaw clutch sleeve for blocking axial advance thereof until synchronization has been effected.

3. A synchronizing transmission as defined in claim 2, wherein said synchronizer ring is provided with a peripheral cam surface adapted to engage the inner end of said bolt and exert a camming action thereagainst as a result of biasing movement of said synchronizer ring.

4. A synchronizing transmission as defined in claim 2, wherein said synchronizer ring is provided with a peripheral, radially outwardly flaring cam notch receiving the inner end of said bolt and adapted to exert a camming action thereagainst as a result of biasing movement of said synchronizer ring.

5. A synchronizing transmission as defined in claim 2, wherein said synchronizer ring carries a rigidly associated axially projecting element and said bolt has at its inner end, a cam surface against which said projecting element is adapted to exert a camming action as a result of biasing movement of said synchronizer ring.

6. A synchronizing transmission as defined in claim 2, wherein said synchronizer ring carries a rigidly mounted axially projecting rod and said bolt has at its inner end a notch in which said rod is received, said notch having a cammed side against which said rod is adapted to exert a camming action as a result of biasing movement of said synchronizer ring.

7. A synchronizing transmission as defined in claim 2, wherein said hub is axially shiftable relative to said other member and said bolt is adapted to lock said movable jaw clutch sleeve, synchronizer ring and hub together for axial movement as a unit until synchronization is effected.

8. A synchronizing transmission as defined in claim 2, wherein said depression is shaped so as to exert a camming action on the outer end of said bolt when axial pressure is applied to said movable jaw clutch sleeve, whereby to urge said bolt inwardly.

9. A synchronizing transmission as defined in claim 2, wherein said bolt has a cammed outer end against which said movable jaw clutch sleeve is adapted to exert a camming action when axial pressure is applied to said movable jaw clutch sleeve, whereby to urge said bolt inwardly.

10. A synchronizing transmission as defined in claim 2, wherein said hub is axially movable relative to said other member, said transmission including a poppet for transmitting axial thrust from said movable jaw clutch sleeve to said hub so as to initiate engagement between said friction clutch elements and produce said biasing action.

11. A synchronizing transmission as defined in claim 2, including resilient means for urging said bolt into yielding engagement with said depression for yieldingly transmitting thrust from said movable jaw clutch sleeve to said synchronizer ring for initiating engagement between said synchronizer ring and its coacting friction clutch elements and thereby producing said biasing action.

12. In a synchronizing transmission, a pair of torque transmitting members to be synchronized, a movable jaw clutch element drivingly associated with one of said members and adapted to be moved into positive clutching engagement with a jaw clutch element drivingly associated with the other member, a movable friction clutch element having a rotary lost motion driving connection with said one member and adapted to be moved into frictional driving engagement with a friction clutch element drivingly associated with said other member, and means acted upon by said movable friction clutch element adapted, when the latter is biased to one limit of its lost motion connection, to be radially projected into engagement with said movable jaw clutch element for blocking axial advance thereof until synchronization has been effected, said one torque transmitting member being axially movable relative to the other and said means being adapted to lock said one torque transmitting member and said movable clutch elements together for axial movement as a unit until synchronization is effected.

13. In a synchronizing transmission, a pair of torque transmitting members to be synchronized, a movable jaw clutch element drivingly associated with one of said members and adapted to be moved into positive clutching engagement with a jaw clutch element drivingly associated with the other member, a movable friction clutch element having a rotary lost motion driving connection with said one member and adapted to be moved into frictional driving engagement with a friction clutch element drivingly associated with said other member, and means acted upon by said movable friction clutch element adapted, when the latter is biased to one limit of its lost motion connection, to be radially projected into engagement with said movable jaw clutch element for blocking axial advance thereof until synchronization has been effected, said one torque transmitting member being axially shiftable relative to the other, said transmission including a yielding breakaway connection between said movable jaw clutch element and said one torque transmitting member for transmitting axial thrust from the former to the latter for initiating engagement between said friction clutch elements so as to produce said biasing action.

14. In a synchronizing transmission, a pair of torque transmitting members to be synchronized, a movable jaw clutch element drivingly associated with one of said members and adapted to be moved into positive clutching engagement with a jaw clutch element drivingly associated with the other member, a movable friction clutch element having a rotary lost motion driving connection with said one member and adapted to be moved into frictional driving engagement with a friction clutch element drivingly associated with said other member, and means acted upon by said movable friction clutch element adapted, when the latter is biased to one limit of its lost motion connection, to be radially projected into engagement with said movable jaw clutch element for blocking axial advance thereof until synchronization has been effected, said means being adapted to yieldingly engage said movable jaw clutch element at such times as said movable friction clutch element is unbiased so as to yieldingly transmit axial thrust from said movable jaw clutch element to said movable friction clutch element for initiating engagement of the latter with its coacting friction clutch element and thereby producing said biasing action.

PALMER ORR.